(12) United States Patent
Kim

(10) Patent No.: US 9,631,917 B2
(45) Date of Patent: Apr. 25, 2017

(54) POSITION DETECTION METHOD, POSITION DETECTION APPARATUS, ANTENNA APPARATUS, AND DISPLAY APPARATUS

(71) Applicant: LG Display Co., Ltd., Seoul (KR)

(72) Inventor: HaZoong Kim, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 599 days.

(21) Appl. No.: 14/106,209

(22) Filed: Dec. 13, 2013

(65) Prior Publication Data

US 2015/0061699 A1 Mar. 5, 2015

(30) Foreign Application Priority Data

Sep. 4, 2013 (KR) .................. 10-2013-0105885

(51) Int. Cl.
*G01R 27/28* (2006.01)
*G01B 7/00* (2006.01)
*G06F 3/046* (2006.01)

(52) U.S. Cl.
CPC .............. *G01B 7/00* (2013.01); *G06F 3/046* (2013.01)

(58) Field of Classification Search
CPC combination set(s) only.
See application file for complete search history.

(56) References Cited

U.S. PATENT DOCUMENTS 5,635,684 A * 6/1997 Fukuzaki ............... G06F 3/046
178/18.07
7,746,275 B2 6/2010 Nagino et al.

FOREIGN PATENT DOCUMENTS

| DE | 695 35 201 T2 | 7/2007 |
| JP | 07-84706 A | 3/1995 |
| JP | 2009-003796 A | 1/2009 |
| JP | 2013-065303 A | 4/2013 |
| WO | WO 2010/030710 A1 | 3/2010 |

* cited by examiner

*Primary Examiner* — Minh Phan
(74) *Attorney, Agent, or Firm* — Fenwick & West LLP

(57) ABSTRACT

Provided are a position detection method that selects one antenna at a time from a plurality of loop antennas, transmits, through the selected loop antenna, an electromagnetic signal to a pointer that indicates a screen unit, receives, from the pointer, a resonance signal corresponding to the electromagnetic signal transmitted through the selected loop antenna, and extracts polar coordinates including a distance value and an angle value of a point on a screen unit indicated by the pointer, based on a distribution of a signal strength of a resonance signal received through each of the plurality of loop antennas, a position detection apparatus, a display apparatus, and an antenna apparatus appropriate for extracting polar coordinates.

12 Claims, 16 Drawing Sheets

(a)

(b)

| POSITION OF POINTER | SIGNAL STRENGTH[mV] |
|---|---|
| P3 | V3 |
| P2 | V2 |
| P4 | V4 |
| P1 | V1 |
| P5 | V5 |
| P6 | V6 |

US 9,631,917 B2

POSITION DETECTION METHOD, POSITION DETECTION APPARATUS, ANTENNA APPARATUS, AND DISPLAY APPARATUS

CROSS-REFERENCE TO RELATED APPLICATION

This application claims priority from and the benefit under 35 U.S.C. §119(a) of Korean Patent Application No. 10-2013-0105885, filed Sep. 4, 2013, which is hereby incorporated by reference for all purposes as if fully set forth herein.

BACKGROUND OF THE INVENTION

1. Field of the Invention

The present invention relates to a position detection method, a position detection apparatus, an antenna apparatus, and a display apparatus.

2. Description of the Prior Art

Recently, mobile terminals such as a smart phone, a smart book, a tablet, and the like, which are Human Interface Devices (HID) associated with an input, provide a human interface for a pen-input type using a pointer such as a pen and the like, in addition to a touch-input type using a finger.

Particularly, the pen-input type allows more fine writing and drawing when compared to the touch-input type using a finger and thus, the pen-input type is more frequently employed. The pen-input type includes an electromagnetic type that uses an electromagnetic inducement phenomenon, and the electromagnetic type is frequently employed for a highly efficient pen input apparatus. The pen-input type based on the electromagnetic type uses an antenna (a loop or a coil) for transceiving a signal to/from a pointer such as a pen and the like.

In general, a display apparatus of a mobile terminal such as a smart phone and the like is provided in a quadrangular shape. However, a smart phone and the like in a form of a wristwatch (smart watch) that has been recently discussed may have a circular display as opposed to a quadrangular display.

When the conventional pen-input type is applied to the circular display, the display apparatus is provided in a circular shape and an antenna is formed in a quadrangular shape and thus, a signal processing is unnatural and complex from a perspective of a shape and a signal processing that extracts X-Y orthogonal coordinates from a received signal.

SUMMARY OF THE INVENTION

Accordingly, the present invention has been made to solve the above-mentioned problems occurring in the prior art, and an object of the present invention is to provide a location detection method that is appropriate for a circular display having a circular position detection area, a position detection apparatus, an antenna apparatus, and a display apparatus.

Another aspect of the present invention is to provide a location detection method that allows pen-input that is appropriate for a circular display having a circular position detection area, a position detection apparatus, an antenna apparatus, and a display apparatus.

Another aspect of the present invention is to provide a position detection method that allows effective signal processing for extracting coordinates, a position detection apparatus, an antenna apparatus, and a display apparatus.

In order to accomplish this object, there is provided a position detection apparatus, including: a polar coordinate antenna unit including a plurality of first loop antennas that are disposed therein, having different radii, and a plurality of second loop antennas that are disposed therein, having different angle ranges; a switching unit to select one antenna at a time from the plurality of first loop antennas, and to select one antenna at a time from the plurality of second loop antennas; a transmitting unit to transmit an electromagnetic signal through the selected first loop antenna, and to transmit an electromagnetic signal through the selected second loop antenna; a receiving unit to receive, from a pointer, a resonance signal corresponding to the electromagnetic signal transmitted through the selected first loop antenna, and to receive, from the pointer, a resonance signal corresponding to the electromagnetic signal transmitted through the selected second loop antenna; and a processor to recognize a distribution of a signal strength of each of the plurality of first loop antennas based on the resonance signal received for each of the plurality of first loop antennas, and to recognize a distribution of a signal strength of each of the plurality of second loop antennas based on the resonance signal received for each of the plurality of second loop antennas, so as to extract polar coordinates including a distance value and an angle value of a point on a screen unit indicated by the pointer.

In accordance with another aspect of the present invention, there is provided a position detection method, including: a signal transmitting and receiving to select one antenna at a time from a plurality of loop antennas, to transmit, through the selected loop antenna, an electromagnetic signal to a pointer indicating a screen unit, and to receive, from the pointer, a resonance signal corresponding to the electromagnetic signal transmitted through the selected loop antenna; and a polar coordinate extraction to extract polar coordinates including a distance value and an angle value of a point on the screen unit indicated by the pointer, based on a distribution of a signal strength of a resonance signal received through each of the plurality of loop antennas.

In accordance with another aspect of the present invention, there is provided a display apparatus, including: a screen unit; and a position detection apparatus to transmit, through each of a plurality of loop antennas, an electromagnetic signal to a pointer that indicates a screen unit, to receive a resonance signal corresponding to the electromagnetic signal transmitted through each of the plurality of loop antennas, and to extract polar coordinates including a distance value and an angle value of a point on the screen unit indicated by the pointer, based on a distribution of a signal strength of a resonance signal received through each of the plurality of loop antennas.

In accordance with another aspect of the present invention, there is provided an antenna apparatus for position detection, including: a plurality of loops in which a first voltage is provided, an electromagnetic signal is generated so that a resonance phenomenon occurs in a pointer that indicates, based on a contact scheme or contactless scheme, a screen unit that is disposed on an upper portion of the antenna apparatus, and a second voltage is generated due to the resonance phenomenon occurring in the pointer, wherein the plurality of loops includes a plurality of first loops disposed therein, having different radii and a plurality of second loops disposed therein, having different angle ranges.

As described above, according to embodiments of the present invention, there are provided a position detection method that is appropriate for a circular display having a circular position detection area, a position detection apparatus, an antenna apparatus, and a display apparatus.

Also, according to embodiments of the present invention, there are provided a position detection method that allows pen-input appropriate for a circular display having a circular position detection area, a position detection apparatus, an antenna apparatus, and a display apparatus.

Also, according to embodiments of the present invention, there are provided a position detection method that allows effective signal processing for extracting coordinates, a position detection apparatus, an antenna apparatus, and a display apparatus.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
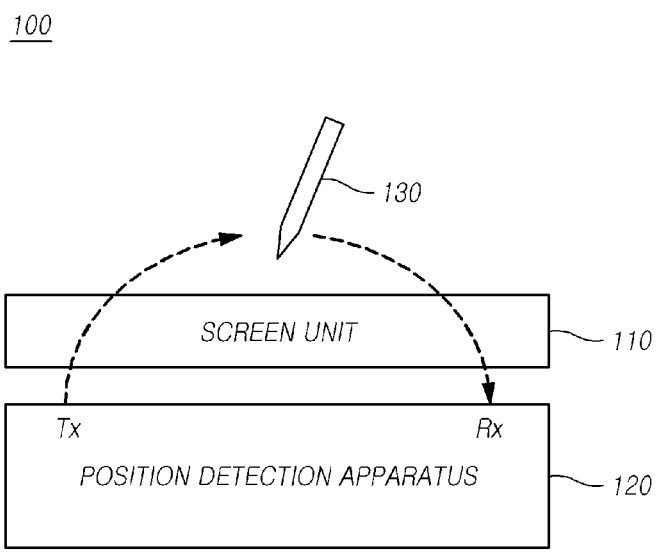
FIG. 1 is a diagram schematically illustrating a display apparatus according to an embodiment of the present invention.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a diagram schematically illustrating a display apparatus 100 according to an embodiment of the present invention. Referring to FIG. 1, the display apparatus 100 according to an embodiment of the present invention includes a screen unit 110 that displays a screen, a position detection apparatus 120 that detects a position of an indicated point when the point on a front surface part of the screen unit 110 is indicated, by a pointer 130 such as a pen and the like, based on a contact type or a contactless type, and the like The position detection apparatus 120 according to an embodiment of the present invention is an apparatus for detecting a position of a point on the front surface part of the screen unit 110 that is indicated, by the pointer 130 such as a pen and the like, based on a contact type or a contactless type, for pen-input of an electromagnetic type using an electromagnetic induction phenomenon. The position detection apparatus 120 is referred to as a pen input apparatus, an input apparatus, or a touch input apparatus.

The described position detection apparatus 120 extracts coordinates of a point indicated by a user using the pointer 130, that is, a point on the screen unit 110 indicated by the pointer 130, so as to detect a position (input position) where the user desires to provide manipulation.

To extract the coordinates of the point on the screen unit 110 indicated by the pointer 130, the position detection apparatus 120 extracts the coordinates using an electromagnetic type. For this, the position detection apparatus 120 includes a plurality of loop antennas for transmitting an electromagnetic signal and receiving a resonance signal occurring in the pointer 130.

The screen unit 110 has a front surface part (a surface which the user views) formed of a display area and a non-display area surrounding the display area. Here, the display area refers to an area where a screen is displayed, and the non-display area refers to an area where a screen is not displayed and displays a button and the like, and is referred to as a bezel area.

At least one of the display area and the non-display area forming the front surface part of the screen unit 110 may be provided in a circular shape. This will be illustrated in FIG. 2 by way of example.

The display apparatus 100 illustrated in FIG. 1 is a mobile terminal such as a smart phone, a tablet, a mobile communication terminal, and the like, or may be a display apparatus included in the mobile terminal.

Figure 2:
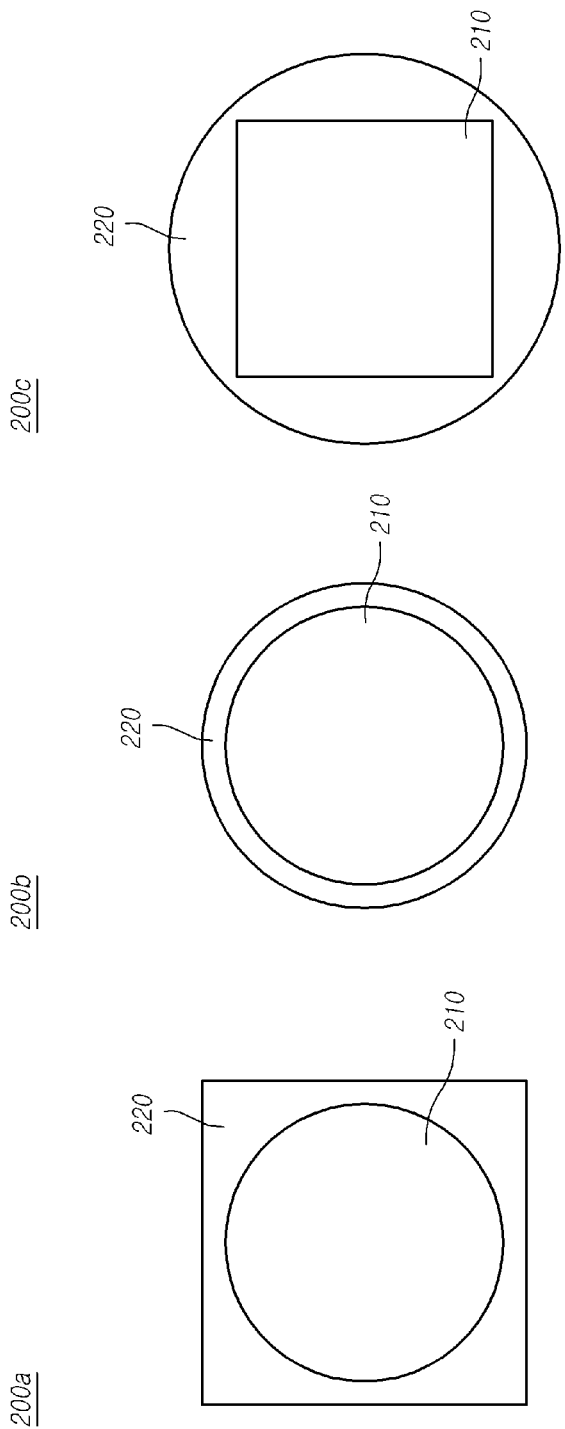
FIG. 2 is a diagram illustrating a shape of a front surface part of a screen unit included in a display apparatus according to an embodiment of the present invention.

FIG. 2 is a diagram illustrating a shape of the front surface part of the screen unit 110 included in the display apparatus 100 according to an embodiment of the present invention. Referring to the first diagram of FIG. 2, the screen unit 110 includes a front surface part 200a formed of a display area 210 provided in a circular shape and a non-display area 220 that surrounds the display area 210 and has an edge formed in a quadrangular shape. Referring to the second diagram of FIG. 2, the screen unit 110 includes a front surface part 200b formed of the display area 210 provided in a circular shape and the non-display area 220 that surrounds the display area 210 and has an edge formed in a circular shape.

Referring to the third diagram of FIG. 2, the screen unit 110 includes a front surface part 200c formed of the display area 210 provided in a quadrangular shape and the non-display area 220 that surrounds the display area 210 and has an edge formed in a circular shape.

As described above, the front surface part 200a, 200b, and 200c of the screen unit 110 is formed of a display area and a non-display area. Only the display area from among the areas may be an area from which the position detection apparatus 120 extracts coordinates (coordinate extraction area=display area), and both areas may be the area from which the position detection apparatus 120 extracts coordinates (coordinate extraction area=display area+non-display area).

As described above, according to the present embodiment, the coordinate extraction area is provided in a circular shape, that is, at least one of the display area and the non-display area is provided in a circular shape, and the screen unit 110 includes a panel (not illustrated) in which pixels are defined in a circular coordinate extraction area (referred to as a position detection area).

Here, in the panel, a row electrode and a column electrode are formed for providing a scan signal and a data signal, and the row electrode and the column electrode are formed in a square matrix shape which is irrespective of a pattern of a plurality of loop antennas, disposed for the position detection apparatus 120 to extract coordinates based on an electromagnetic type.

Also, in the panel, a row electrode and a column electrode are formed for providing a scan signal and a data signal, and row electrodes having different radii are formed in a circular shape and column electrodes are formed to intersect with the row electrodes so that the row electrodes and the column electrodes correspond to a pattern of the plurality of loop antennas, disposed for the position detection apparatus 120 to extract coordinates based on an electromagnetic type.

Also, the panel is one of a Liquid Crystal Display (LCD) panel, an Organic Light Emitting Diode (OLED) panel, and the like.

A shape that the coordinate extraction area (a display area or a total area including the display area and a non-display area) has in the screen unit 110 is associated with a type of coordinates that is efficient for position detection when the position detection apparatus 120 extracts coordinates for position detection.

For example, when the coordinate extraction area is provided in a quadrangular shape, extraction of orthogonal coordinates is more efficient. When the coordinate extraction area is provided in a circular shape, extraction of polar coordinates is more efficient.

As described above, in the present embodiment, the coordinate extraction area is provided in a circular shape, that is, at least one of the display area and the non-display area is a circular shape and thus, the position detection apparatus 120 extracts polar coordinates as coordinates of a point on the screen unit 110 indicated by the pointer 130.

To extract the polar coordinates as the coordinates of the point on the screen unit 110 indicated by the pointer 130, the position detection apparatus 120 may transmit, through each of the plurality of loop antennas, an electromagnetic signal to the pointer 130 that indicates the screen unit 110, may receive, from the pointer 130, a resonance signal corresponding to the electromagnetic signal transmitted through each of the plurality of loop antennas, and may extract the polar coordinates including a distance value and an angle value of the point on the screen unit 110 indicated by the pointer 130, based on a distribution of a signal strength of a resonance signal received through each of the plurality of loop antennas.

In the present embodiment, the position detection apparatus 120 extracts polar coordinates as opposed to orthogonal coordinates, as the coordinates of the point on the screen unit 110 indicated by the pointer 130 and thus, the plurality of loop antennas are designed accordingly.

Therefore, one group of the plurality of loop antennas (a first loop antenna group) is designed to extract a distance value of the polar coordinates, and another group (a second loop antenna group) is designed to extract an angle value of the polar coordinates.

For example, the plurality of loop antennas are designed to include a plurality of first loop antennas disposed therein, having different radii, and a plurality of second loop antennas disposed therein, having different angle ranges.

Also, the plurality of first loop antennas have different radii, and are disposed to be spaced apart from one another or to partially intersect with one another. Also, the plurality of second loop antennas have different angle ranges, and are disposed to be spaced apart from one another or to partially intersect with one another. A shape and a structural characteristic such as disposition and the like of the plurality of first loop antennas and the plurality of second loop antennas will be described in detail with reference to FIG. 3.

As described above, when the plurality of first loop antennas and the plurality of second loop antennas are included for extraction of polar coordinates, the position detection apparatus 120 selects one antenna at a time from the plurality of first loop antennas and selects one antenna at a time from the plurality of second loop antennas, transmits an electromagnetic signal through the selected first loop antenna and transmits an electromagnetic signal through the selected second loop antenna, receives, from the pointer 130, a resonance signal corresponding to the electromagnetic signal transmitted through the selected first loop antenna and receives, from the pointer 130, a resonance signal corresponding to the electromagnetic signal transmitted through the selected second loop antenna, recognizes a distribution of a signal strength of each of the plurality of first loop antennas based on a resonance signal received for each of the plurality of first loop antennas and recognizes a distribution of a signal strength of each of the plurality of second loop antennas based on a resonance signal received for each of the plurality of second loop antennas, and extracts polar coordinates including a distance value and an angle value of a point on the screen unit 110 indicated by the pointer 130.

Hereinafter, the position detection apparatus 120 that has been briefly described will be described in detail with reference to FIG. 3.

Figure 3:
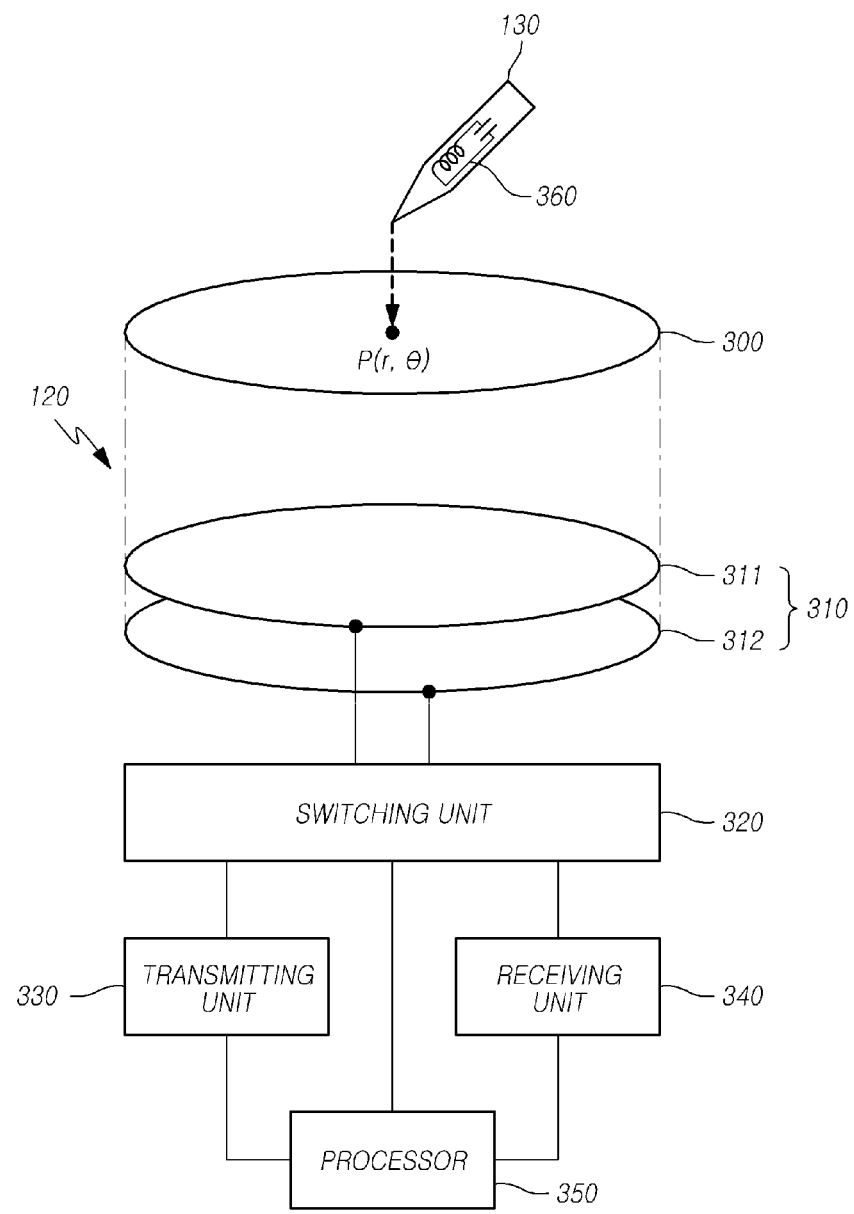
FIG. 3 is a diagram illustrating a position detection apparatus according to an embodiment of the present invention.

FIG. 3 is a diagram illustrating a position detection apparatus according to an embodiment of the present invention. Referring to FIG. 3, when a user indicates a point (P) on a front surface part (200a, 200b, or 200c) of the screen unit 110 using the pointer 130, that is, when the pointer 130 indicates the point (P) on a coordinate extraction area 300 provided in a circular shape in the front surface part 200a, 200b, or 200c of the screen unit 110, the position detection apparatus 120 extracts polar coordinates with respect to the point (P) on the coordinate extraction area 300 of the screen unit 110 indicated by the pointer 130.

Referring to FIG. 3, the position detection apparatus 120 includes a polar coordinate antenna unit 310 to transmit an electromagnetic signal and to receive a resonance signal, a switching unit 320 to perform switching for selection and connection of a loop antenna, a transmitting unit 330 to transmit an electromagnetic signal through a loop antenna, a receiving unit 340 to receive a resonance signal through a loop antenna, and a processor 350 to extract polar coordinates (r, θ) based on a received resonance signal.

The polar coordinate antenna unit 310 includes a plurality of first loop antennas 311 that have different radii and are disposed as polar coordinate antennas for extracting a distance value, and a plurality of second loop antennas 312 that have different angle ranges, and are disposed as polar coordinate antennas for extracting an angle value.

The switching unit 320 may perform a switching operation (a first switching operation) to select one antenna at a time from the plurality of first loop antennas 311, and a switching operation (a second switching operation) to connect the selected first loop antenna with one of the transmitting unit 330 and the receiving unit 340. Also, the switching unit 320 may perform a switching operation (a first switching operation) to select one antenna at a time from the plurality of second loop antennas 312, and a switching operation (a second switching operation) to connect the selected second loop antenna with one of the transmitting unit 330 and the receiving unit 340.

Hereinafter, the operations of the switching unit 320, the transmitting unit 330, the receiving unit 340, and the processor 350 will be described from a perspective of extraction of a distance value and extraction of an angle value.

First, the operations of each component associated with the extraction of a distance value will be described based on a procedure of extraction of a distance value.

The switching unit 320 selects one of the plurality of first loop antennas 311 (the first switching operation).

The switching unit 320 connects the first loop antenna selected from the plurality of first loop antennas 311 with the transmitting unit 330 (the second switching operation).

When the first loop antenna selected from the plurality of first loop antennas 311 is connected with the transmitting unit 330, the transmitting unit 330 transmits an electromagnetic signal through the first loop antenna selected from the plurality of first loop antennas 311.

In association with the above, the transmitting unit 330 provides a predetermined voltage to both ends of the first loop antenna selected by the switching unit 320, so as to allow a current to flow through the selected first loop antenna, and generates a magnetic field by the current flowing through the first loop antenna. The magnetic field generated in this manner corresponds to an electromagnetic signal that is transmitted to the pointer 130.

In this manner, when the transmitting unit 330 allows a current to flow through the selected first loop antenna and a magnetic field is generated in the selected first loop antenna, that is, when an electromagnetic signal is transmitted, a current is induced in a resonant circuit 360 inside the pointer 130 and a voltage (electromotive force) is generated and thus, a resonance phenomenon happens.

In this example, the switching unit 320 interrupts the connection between the first loop antenna that transmitted the electromagnetic signal and the transmitting unit 330, and performs a switching operation (the second switching operation) to connect the first loop antenna that transmitted the electromagnetic signal with the receiving unit 340.

In this manner, when the first loop antenna that transmitted the electromagnetic signal is connected with the receiving unit 340, the receiving unit 340 receives, from the pointer 130, a resonance signal corresponding to the electromagnetic signal transmitted through the first loop antenna selected from the plurality of first loop antennas 311.

Through this procedure, when the receiving unit 340 receives all of the resonance signals respectively through the plurality of first loop antennas 311, the processor 350 recognizes a distribution of a signal strength of each of the plurality of first loop antennas 311 based on the resonance signal received for each of the plurality of first loop antennas 311, and extracts a distance value r of a point (P) on the coordinate extraction area 300 of the screen unit 130 indicated by the pointer 130, based on the recognized result.

Next, the operations of each component associated with extraction of an angle value will be described based on a procedure of extraction of an angle value. This is basically identical to the operations of each component associated with the extraction of a distance value.

The switching unit 320 selects one antenna at a time from the plurality of second loop antennas 312 (the first switching operation).

The switching unit 320 connects the second loop antenna selected from the plurality of second loop antennas 312 with the transmitting unit 330 (the second switching operation).

When the second loop antenna selected from the plurality of second loop antennas 312 is connected with the transmitting unit 330, the transmitting unit 330 transmits an electromagnetic signal through the second loop antenna selected from the plurality of second loop antennas 312.

In association with the above, the transmitting unit 330 provides a predetermined voltage to both ends of the second loop antenna selected by the switching unit 320, so as to allow a current to flow through the selected second loop antenna, and generates a magnetic field by the current flowing through the second loop antenna. The magnetic field generated in this manner corresponds to an electromagnetic signal that is transmitted to the pointer 130.

In this manner, when the transmitting unit 330 allows a current to flow through the selected second loop antenna and a magnetic field is generated from the selected second loop antenna, that is, when an electromagnetic signal is transmitted, a current is induced in the resonant circuit 360 inside the pointer 130 and a voltage (electromotive force) is generated and thus, a resonance phenomenon happens.

In this example, the switching unit 320 interrupts the connection between the second loop antenna that transmitted the electromagnetic signal and the transmitting unit 330, and performs a switching operation (the second switching operation) to connect the second loop antenna that transmitted the electromagnetic signal with the receiving unit 340.

In this manner, when the second loop antenna that transmitted the electromagnetic signal is connected with the receiving unit 340, the receiving unit 340 receives, from the pointer 130, a resonance signal corresponding to the electromagnetic signal transmitted through the second loop antenna selected from the plurality of second loop antennas 312.

Through the procedure, when the receiving unit 340 receives all of the resonance signals respectively through the plurality of second loop antennas 312, the processor 350 recognizes a distribution of a signal strength of each of the plurality of second loop antennas 311 based on the resonance signal received for each of the plurality of second loop antennas 312, and extracts an angle value θ of the point (P) on the coordinate extraction area 300 of the screen unit 110 indicated by the pointer 130, based on the recognized result.

As described above, when the processor 350 extracts the distance value r and the angle value θ of the point (P) on the coordinate extraction area 300 of the screen unit 110 indicated by the pointer 130, the polar coordinates (r, θ) of the point (P) on the coordinate extraction area 300 of the screen unit 110 indicated by the pointer 130 are extracted.

Any of the extraction of a distance value and the extraction of an angle value may be executed first.

A number of the plurality of first loop antennas 311 corresponding to polar coordinate antennas for extracting a distance value may be determined based on a predetermined distance resolution. Here, the distance resolution is an index of a performance of distinguishing a distance value between two points. As a distance resolution becomes higher, two points of a distinguished distance value become closer. That is, as a distance resolution becomes higher, a distinguishable distance value of two points becomes closer.

Also, a number of the plurality of second loop antennas 312 corresponding to polar coordinate antennas for extracting an angle value is determined based on a predetermined angle resolution. Here, the angle resolution is an index of a performance of distinguishing an angle value between two points. As an angle resolution becomes higher, two points of a distinguished angle value become closer. That is, as an angle resolution becomes higher, a distinguishable angle value between two points becomes smaller.

The plurality of first loop antennas 311 may include a first loop antenna that is provided in a circular shape and has a minimum radius, and at least two first loop antennas that are provided in a donut shape and have radii greater than the minimum radius.

The plurality of first loop antennas 311 may have different radii and may be disposed to be spaced apart from one another. Depending on the case, the plurality of first loop antennas 311 may have different radii, and may be disposed to intersect with one another. Here, the reason why the plurality of first loop antennas 311 are disposed to intersect with one another, is to increase a distance resolution.

Therefore, a number of the plurality of first loop antennas 311 of which radii intersect with one another is determined based on a predetermined distance resolution.

The plurality of second loop antennas 312 may include at least two second loop antennas that are provided in a fan shape, and have an identical central angle and have different angle ranges.

The plurality of second loop antennas 312 may have different angle ranges, and may be disposed to be spaced apart from one another. Depending on a case, the plurality of second loop antennas 312 may have different angle ranges, and may be disposed to intersect with one another. Here, the reason why the plurality of second loop antennas 312 are disposed to intersect with one another is to increase an angle resolution.

Therefore, a number of the plurality of second loop antennas 312 of which radii intersect with one another is determined based on a predetermined angle resolution.

After the position detection apparatus 120 extracts the polar coordinates of the point (P) on the screen unit 110 indicated by the pointer 130, the processor 350 may perform a process corresponding to the extracted polar coordinates. Here, the process corresponding to the extracted polar coordinates, may be, for example, a process corresponding to an object displayed on the point (P) of the polar coordinates in the screen unit 110, a screen changing process, an application execution process, a character input process, and the like, and may not be limited thereto and may correspond to all processes associated with an operation that may be performed by manipulation of a user.

Hereinafter, a shape and a structural characteristic of the plurality of first loop antennas 311 and the plurality of second loop antennas 312 included in the polar coordinate antenna unit 310 will be illustratively described with reference to FIGS. 4 through 7.

Figure 4:
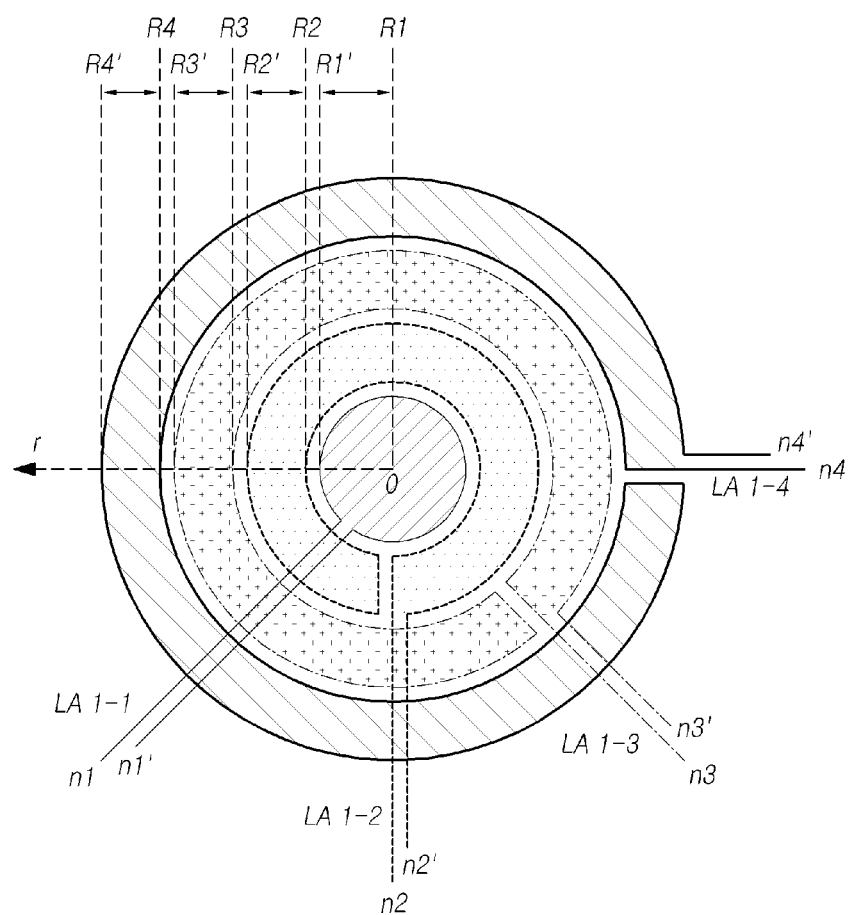
FIG. 4 is an illustrative diagram of a first loop antenna according to an embodiment of the present invention.

FIG. 4 is a diagram illustrating the first loop antenna 311 corresponding to a polar coordinate antenna for extracting a distance value according to an embodiment of the present invention. FIG. 4 is a diagram illustrating four first loop antennas 311 including LA1-1, LA1-2, LA1-3, and LA1-4 when a number of first loop antennas 311 is 4. Here, LA is an abbreviation of Loop Antenna.

Referring to FIG. 4, LA1-1, LA1-2, LA1-3, and LA1-4 corresponding to four first loop antennas 311 have different radii from one another. That is, a radius of LA1-1 is a radius corresponding to a circle of which a radius is R1~R1' (a radius of R1~R1'). A radius of LA1-2 is a range of an overlap between the outside of a circle of which a radius is R2 and the inside of a circle of which a radius is R2' (a radius of R2~R2'). A radius of LA1-3 is a range of an overlap between the outside of a circle of which a radius is R3 and the inside of a circle of which a radius is R3' (a radius of R3~R3'). A radius of LA1-4 is a range of an overlap between the outside of a circle of which a radius is R4 and the inside of a circle of which a radius is R4' (a radius of R4~R4').

The radii of each of LA1-1, LA1-2, LA1-3, and LA1-4 are different from one another. That is, a radius of a loop antenna increases in order of LA1-1, LA1-2, LA1-3, and LA1-4. That is, LA1-1 has the smallest radius, and the LA1-4 has the largest radius.

Also, referring to FIG. 4, LA1-1, LA1-2, LA1-3, and LA1-4 corresponding to the four loop antennas 311, each has two nodes at an end thereof. That is, LA1-1 has n1 and n1' nodes at an end thereof. LA1-2 has n2 and n2' nodes at an end thereof. LA1-3 has n3 and n3' nodes at an end thereof. LA1-4 has n4 and n4' nodes at an end thereof.

Two nodes of each of LA1-1, LA1-2, LA1-3, and LA1-4 are nodes that are switched, when the switching unit 320 selects a first loop antenna. For example, when the two nodes (n1 and n1') of LA1-1 from among LA1-1, LA1-2, LA1-3, and LA1-4 are selected by the switching unit 320, the two nodes (n1 and n1') of LA1-1 are connected with the transmitting unit 330 or the receiving unit 340 so that an electromagnetic signal is transmitted and a resonance signal is received through LA1-1.

The shape of the four first loop antennas 311 will be described with reference to FIG. 4. The four first loop antennas 311 include a first loop antenna (LA1-1) that has a minimum radius and is provided in a circular shape, and three first loop antennas (LA1-2, LA1-3, and LA1-4) that are provided in a donut shape and have radii that are sequentially greater than the minimum radius.

The disposition of the four first loop antennas 311 will be described with reference to FIG. 4. The four first loop antennas 311 have different radii and are disposed to be spaced apart from one another. Unlike the disposition, the four first loop antennas 311 are disposed, having different radii, and may be disposed to intersect with one another. In this manner, the intersecting disposition is illustrated in FIG. 5.

Figure 5:
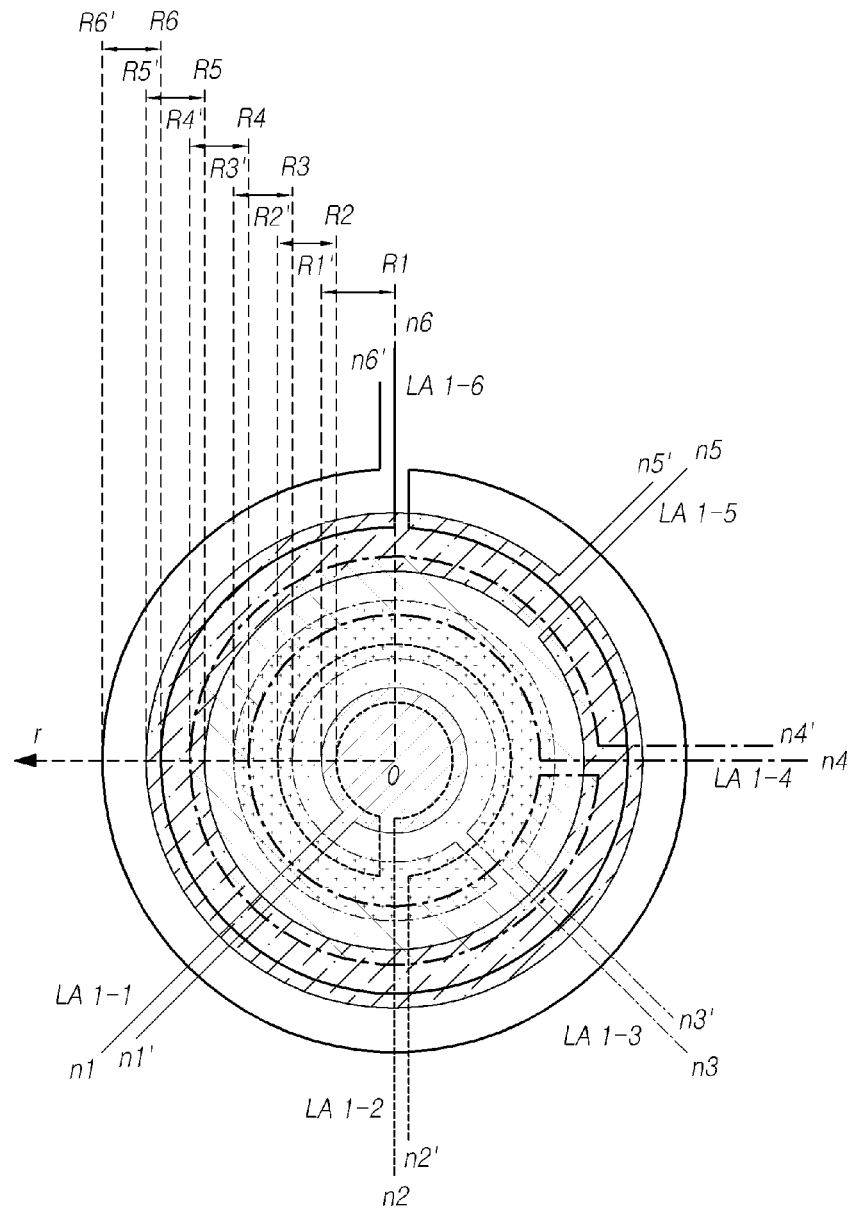
FIG. 5 is another illustrative diagram of a first loop antenna according to an embodiment of the present invention.

FIG. 5 is another illustrative diagram of the first loop antenna 311 according to an embodiment of the present invention. Referring to FIG. 5, six first loop antennas 311 including LA1-1, LA1-2, LA1-3, LA1-4, LA1-5, and LA1-6 are disposed as polar coordinate antennas for extracting a distance value. Referring to FIG. 5, LA1-1, LA1-2, LA1-3, LA1-4, LA1-5, and LA1-6 corresponding to the six first loop antennas 311 have different radii from one another. That is, a radius of LA1-1 is a range corresponding to a circle of which a radius is R1~R1' (a radius of R1~R1'). A radius of LA1-2 is a range of an overlap between the outside of a circle of which a radius is R2 and the inside of a circle of which a radius is R2' (a radius of R2~R2'). A radius of LA1-3 is a range of an overlap between the outside of a circle of which a radius is R3 and the inside of a circle of which a radius is R3' (a radius of R3~R3'). A radius of LA1-4 is a range of an overlap between the outside of a circle of which a radius is R4 and the inside of a circle of which a radius is R4' (a radius of R4~R4'). A radius of LA1-5 is a range of an overlap between the outside of a circle of which a radius is R5 and the inside of a circle of which a radius is R5' (a radius of R5~R5'). A radius of LA1-6 is a range of an overlap between the outside of a circle of which a radius is R6 and the inside of a circle of which a radius is R6' (a radius of R6~R6'). Referring to FIG. 5, LA1-1, LA1-2, LA1-3, LA1-4, LA1-5, and LA1-6 are disposed so that radii of each loop antenna intersect with one another.

In FIG. 5, as an example, the radius of LA1-2 (R2~R2') intersects with the radius of LA1-1 (R1~R1'), and also intersects with the radius of LA1-3 (R3~R3'). The radius of LA1-3 (R3~R3') intersects with the radius of LA1-2 (R2~R2'), and also intersects with the radius of LA1-4 (R4~R4'). In this manner, a radius of a single first loop antenna may be disposed to overlap radii of two adjacent first loop antennas.

As described above, in a case in which a distance value is extracted from the disposition where first loop antennas are disposed to intersect with one another, a more accurate distance value may be extracted when compared to a case in which a distance value is extracted from the disposition where first loop antennas are disposed to be spaced apart from one another as opposed to intersecting with one another. Therefore, a distance resolution may increase.

As described in FIG. 5, a number of radii with which a radius of a single first loop antenna intersects (2 in a case of FIG. 5) is determined based on a predetermined distance resolution.

Subsequently, a shape and a structural characteristic associated with the plurality of second loop antennas 312 which are polar coordinate antennas for extracting an angle value will be described with reference to FIG. 6.

Figure 6:
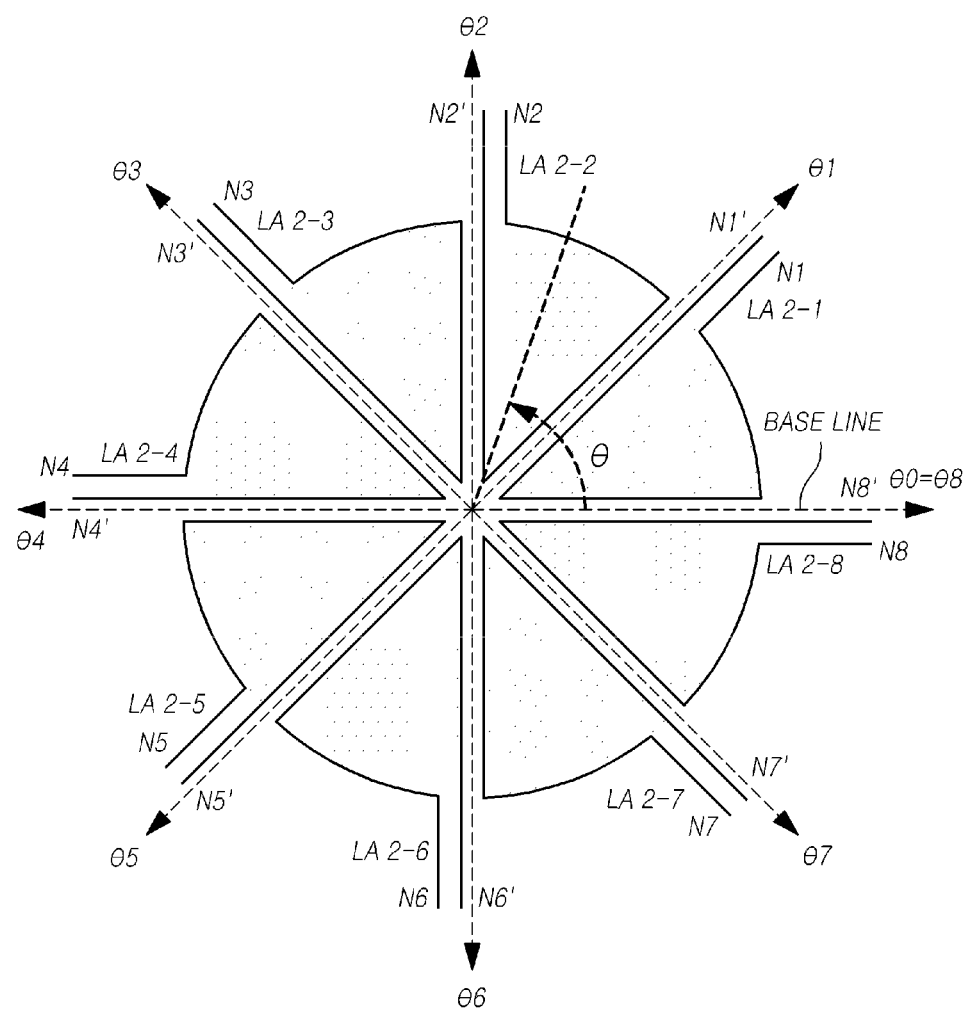
FIG. 6 is an illustrative diagram of a second loop antenna according to an embodiment of the present invention.

FIG. 6 is an illustrative diagram of the second loop antenna 312 according to an embodiment of the present invention.

FIG. 6 is an illustrative diagram of eight second loop antennas 312 including LA2-1, LA2-2, LA2-3, LA2-4, LA2-5, LA2-6, LA2-7, and LA2-8 when a number of the plurality of second loop antennas 312 is 8. Referring to FIG. 6, LA2-1, LA2-2, LA2-3, LA2-4, LA2-5, LA2-6, LA2-7, and LA2-8 corresponding to six second loop antennas 312 have different angle ranges from one another. That is, LA2-1 has an angle range from $\theta 0(=0°)$ which is an angle at a base line to $\theta 1$. LA2-2 has an angle range from $\theta 1$ to $\theta 2$. LA2-3 has an angle range from $\theta 2$ to $\theta 3$. LA2-4 has an angle range from $\theta 3$ to $\theta 4$. LA2-5 has an angle range from $\theta 4$ to $\theta 5$. LA2-6 has an angle range from $\theta 5$ to $\theta 6$. LA2-7 has an angle range from $\theta 6$ to $\theta 7$. LA2-8 has an angle range from $\theta 7$ to $\theta 8 (=\theta 0)$.

Also, a central angle of each of LA2-1, LA2-2, LA2-3, LA2-4, LA2-5, LA2-6, LA2-7, and LA2-8 is identical (that is, a central angle $(\Delta\theta)=\theta 1-\theta 0=\theta 2-\theta 1=\theta 3-\theta 2=\theta 4-\theta 3=\theta 5-\theta 4=\theta 6-\theta 5=\theta 7-\theta 6=\theta 8-\theta 7=45°)$. Here, when a number of second loop antennas is N, a central angle of each second loop antenna is 360/N.

Also, referring to FIG. 6, each of LA2-1, LA2-2, LA2-3, LA2-4, LA2-5, LA2-6, LA2-7, and LA2-8 corresponding to eight second loop antennas 312 has two nodes at an end thereof.

That is, NA2-1 has nodes N1 and N1' at an end thereof. LA2-2 has nodes N2 and N2' at an end thereof. NA2-3 has nodes N3 and N3' at an end thereof. NA2-4 has nodes N4 and N4' at an end thereof. NA2-5 has nodes N5 and N5' at an end thereof. NA2-6 has nodes N6 and N6' at an end thereof. NA2-7 has nodes N7 and N7' at an end thereof. NA2-8 has nodes N8 and N8' at an end thereof.

The two nodes of each of LA2-1, LA2-2, LA2-3, LA2-4, LA2-5, LA2-6, LA2-7, and LA2-8 are nodes that are switched when the switching unit 320 selects a second loop antenna.

For example, when the two nodes of LA2-1 (N1 and N1') from among LA2-1, LA2-2, LA2-3, LA2-4, LA2-5, LA2-6, LA2-7, and LA2-8 are selected by the switching unit 320, the two nodes of LA2-1 (N1 and N1') are connected to the transmitting unit 330 or the receiving unit 340, and an electromagnetic signal is transmitted and a resonance signal is received through LA2-1.

A shape of the eight second loop antennas 312 will be described with reference to FIG. 6. The eight second loop antennas 312 may be, for example, loop antennas that are provided in a fan shape, and have an identical central angle $(\Delta\theta)$ and have different angle ranges.

The disposition of the eight second loop antennas 312 will be described with reference to FIG. 6. The eight second loop antennas 312 are disposed to be spaced apart from one another, having different angle ranges.

Unlike the above disposition, the eight second loop antennas 312 may be disposed, having different angle ranges, and may be disposed to intersect with one another. The intersecting disposition is illustrated in FIG. 7.

Figure 7:
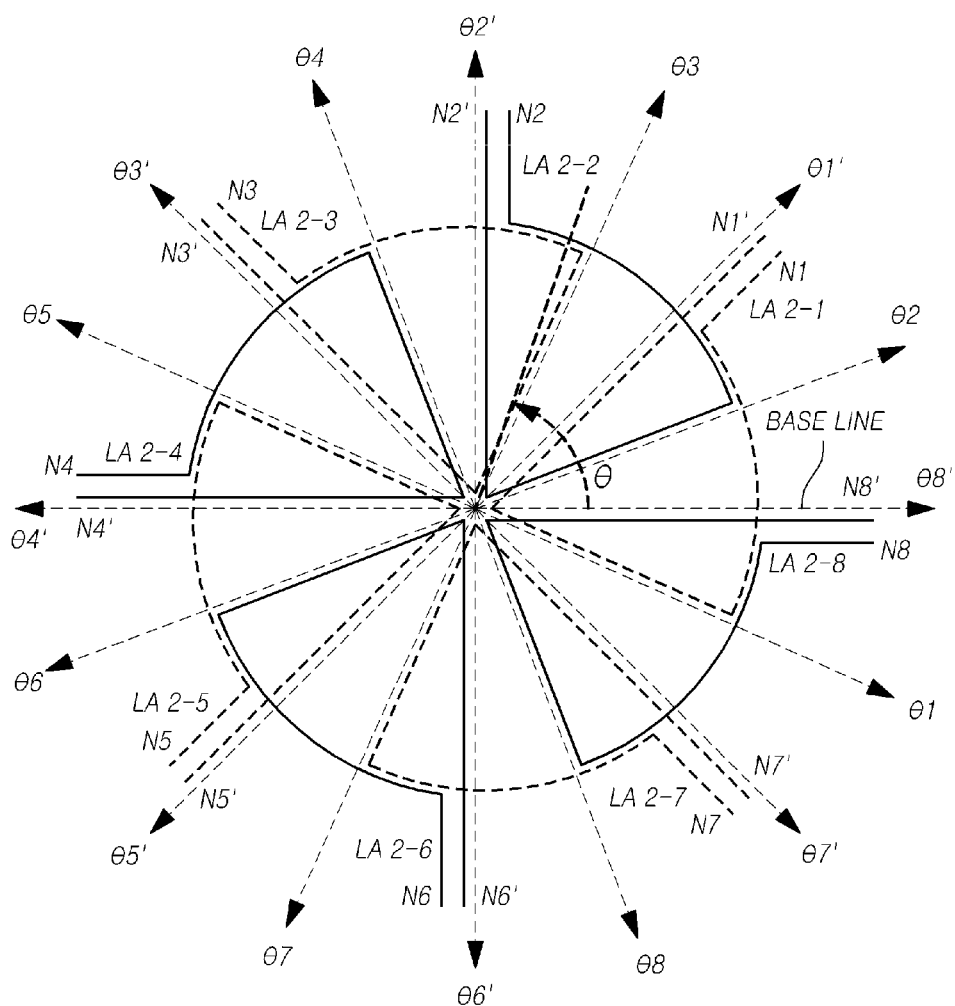
FIG. 7 is another illustrative diagram of a second loop antenna according to an embodiment of the present invention.

FIG. 7 is another illustrative diagram of the second loop antenna 312 according to an embodiment of the present invention.

Referring to FIG. 7, eight second loop antennas 312 including LA2-1, LA2-2, LA2-3, LA2-4, LA2-5, LA2-6, LA2-7, and LA2-8 are disposed as polar coordinate antennas for extracting an angle value.

Referring to FIG. 7, each of LA2-1, LA2-2, LA2-3, LA2-4, LA2-5, LA2-6, LA2-7, and LA2-8 corresponding to the eight second loop antennas 311 has an identical central angle $(\Delta\theta)$ of 22.5°.

Also, referring to FIG. 7, LA2-1, LA2-2, LA2-3, LA2-4, LA2-5, LA2-6, LA2-7, and LA2-8 corresponding to the eight second loop antennas 311 have different radii from one another.

That is, LA2-1 has an angle range from $\theta 1$ to $\theta 1'$. LA2-2 has an angle range from $\theta 2$ to $\theta 2'$. LA2-3 has an angle range from $\theta 3$ to $\theta 3'$. LA2-4 has an angle range from $\theta 4$ to $\theta 4'$. LA2-5 has an angle range from $\theta 5$ to $\theta 5'$. LA2-6 has an angle range from $\theta 6$ to $\theta 6'$. LA2-7 has an angle range from $\theta 7$ to $\theta 7'$. LA2-8 has an angle range from $\theta 8$ to $\theta 8'$.

Here, the base line divides $\theta 1$ and $\theta 2$ into two sections, and $\theta 8'$ corresponds to 0°. Therefore, $\theta 8'$, $\theta 2$, $\theta 1'$, $\theta 3$, $\theta 2'$, $\theta 4$, θ3', θ5, θ4', θ6, θ5', θ7, θ6', θ8, θ7', and θ1, counterclockwise from a base line of 0°, correspond to 0°, (0+1*22.5)°, (0+2*22.5)°, (0+3*22.5)°, . . . , and (0+15*22.5)°.

Referring to FIG. 7, LA2-1, LA2-2, LA2-3, LA2-4, LA2-5, LA2-6, LA2-7, and LA2-8 are disposed so that an angle range of each loop antenna intersects with one another.

In FIG. 7, as an example, the angle range of LA2-2 (θ2~θ2') intersects with the angle range (θ1~θ1') of LA2-1, and also intersects with the angle range (θ3~θ3') of LA2-3. The angle range (θ3~θ3') of LA2-3 intersects with the angle range (θ2~θ2') of LA2-2, and also intersects with the angle range of LA2-4 (θ4~θ4'). In this manner, an angle range of a single second loop antenna is disposed to overlap angle ranges of two adjacent second loop antennas.

As described above, in a case in which an angle value is extracted from the disposition in which second loop antennas are disposed to intersect with one another, a more accurate angle value is extracted when compared to a case in which an angle value is extracted from the disposition in which the second loop antennas are disposed to be spaced apart from one another as opposed to intersecting with one another. Therefore, an angle resolution may increase.

As described in FIG. 7, a number of angle ranges with which an angle range of a single second loop antenna intersects (2 in a case of FIG. 7) is determined based on a predetermined angle resolution.

An antenna structure according to the present embodiment that has been described is designed to be appropriate for extracting polar coordinates. A scheme of extracting polar coordinates of a point on the screen unit 110 indicated by a user using the pointer 130 will be described with reference to FIGS. 8 through 12.

First, a scheme and a principle of extracting a distance value of polar coordinates will be described with reference to FIGS. 8 and 9.

Figure 8:
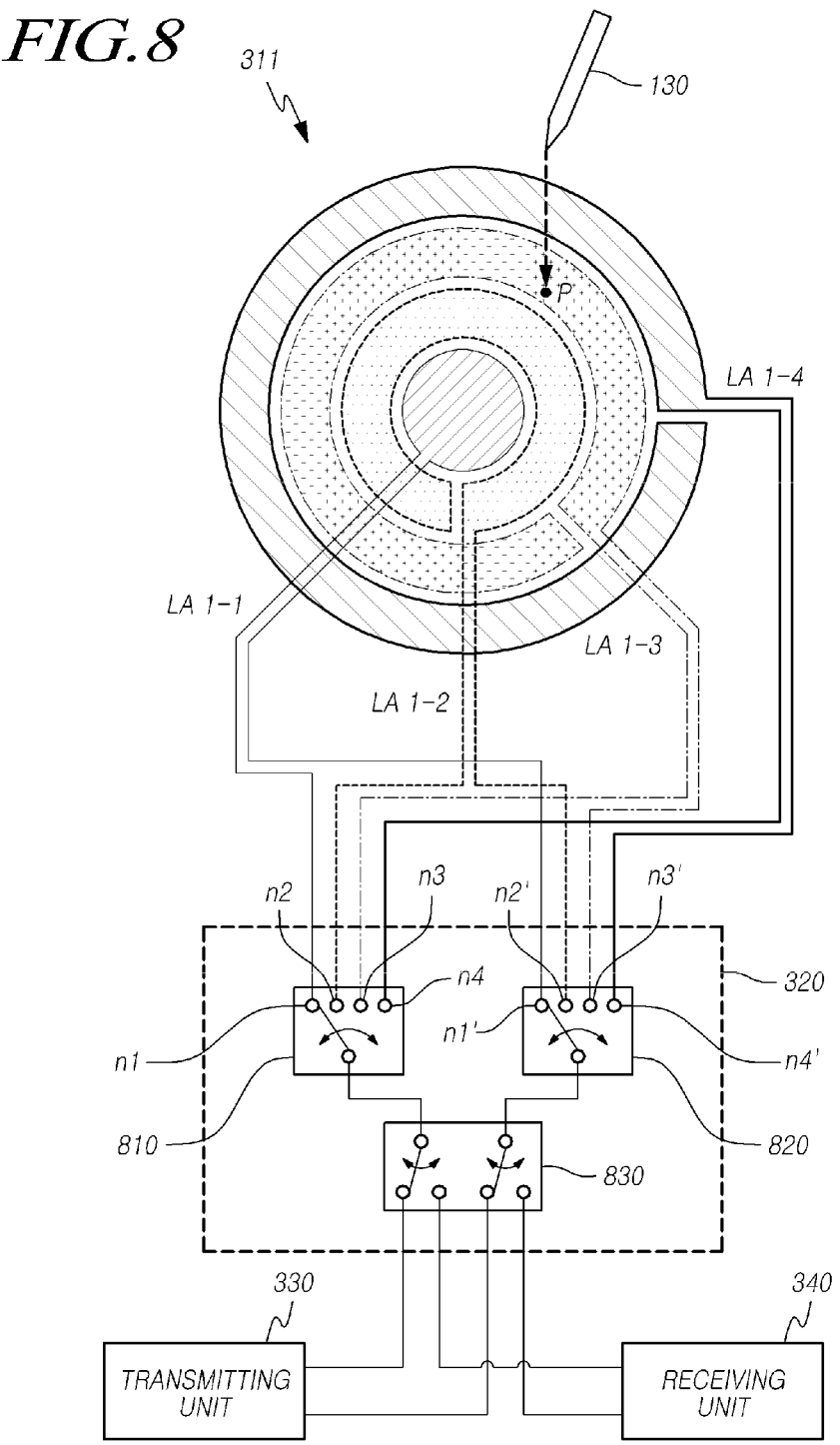
FIG. 8 is a diagram illustrating operations of a position detection apparatus for extracting a distance value of polar coordinates.

FIG. 8 is a diagram illustrating operations of the switching unit 320, the transmitting unit 330, the receiving unit 340, and the processor 350 included in the position detection apparatus 120 for extracting a distance value of polar coordinates.

The switching operation will be described with reference to FIG. 8. The switching unit 320 selects one antenna at a time from LA1-1, LA1-2, LA1-3, and LA1-4 corresponding four first loop antennas 311 using antenna selecting switches 810 and 820, and connects the first loop antenna selected by the selecting switches 810 and 820 with the transmitting unit 330 or the receiving unit 340 using a transmitting/receiving switch 830.

First, the antenna selecting switches 810 and 820 select two nodes (n1 and n1') included in an end of LA1-1 from among two nodes of an end of each of the four first loop antennas 311.

The transmitting/receiving switch 830 performs switching so as to connect the two nodes (n1 and n1') included in the end of LA1-1 with the transmitting unit 330 through a circuit.

Accordingly, the transmitting unit 330 provides a predetermined voltage to the two nodes (n1 and n1') of the end of LA1-1, and transmits an electromagnetic signal (magnetic field) to the pointer 130 so that a magnetic field is generated in LA1-1.

Subsequently, the transmitting/receiving switch 830 performs switching so as to connect the two nodes (n1 and n1') included in the end of LA1-1 with the receiving unit 340 through a circuit.

Accordingly, the receiving unit 340 receives a resonance signal transmitted from the pointer 130 through LA1-1. Here, receiving a resonance signal indicates measuring a voltage that is induced in the two nodes (n1 and n1') of the end of LA1-1 by a resonance phenomenon occurring in the resonance circuit 360 of the pointer 130.

The processor 350 stores a signal strength of a resonance signal received through LA1-1. Here, the signal strength of the resonance signal may be the voltage (unit: [mV]) induced in the two nodes (n1 and n1') of the end of LA1-1 by the resonance phenomenon occurring in the resonance circuit 360 of the pointer 130.

Subsequently, the antenna selecting switches 810 and 820 select two nodes (n2 and n2') included in the end of LA1-2 from among two nodes included in the end of each of the four first loop antennas 311.

Subsequently, the transmitting/receiving switch 830 performs switching so as to connect the two nodes (n2 and n2') included in the end of LA1-2 with the transmitting unit 330 through a circuit.

Accordingly, the transmitting unit 330 provides a predetermined voltage to the two nodes (n2 and n2') of the end of LA1-2, and transmits an electromagnetic signal (magnetic field) to the pointer 130 so that a magnetic field is generated in LA1-2.

Subsequently, the transmitting/receiving switch 830 performs switching so as to connect the two nodes (n2 and n2') included in the end of LA1-2 with the receiving unit 340 through a circuit.

Accordingly, the receiving unit 340 receives a resonance signal transmitted from the pointer 130 through LA1-2. Here, receiving a resonance signal indicates measuring a voltage that is induced in the two nodes (n2 and n2') of the end of LA1-2 by a resonance phenomenon occurring in the resonance circuit 360 of the pointer 130.

The processor 350 stores a signal strength of a resonance signal received through LA1-2. Here, the signal strength of the resonance signal may be the voltage (unit: [mV]) induced in the two nodes (n2 and n2') of the end of LA1-2 by the resonance phenomenon occurring in the resonance circuit 360 of the pointer 130.

As described above, the processor 350 stores a signal strength of a resonance signal received through LA1-3, and stores a signal strength of a resonance signal received through LA1-4 and thus, may recognize a distribution of signal strengths of resonance signals received through all of the first loop antennas 311 as information for extracting a distance value.

It is assumed that a point indicated by the pointer 130 is an area included in a radius of LA1-3 (a radius of R3~R3'), with reference to FIG. 8. In this example, the distribution of signal strengths of the resonance signals recognized by the processor 350 is illustrated in FIG. 9.

Figure 9:
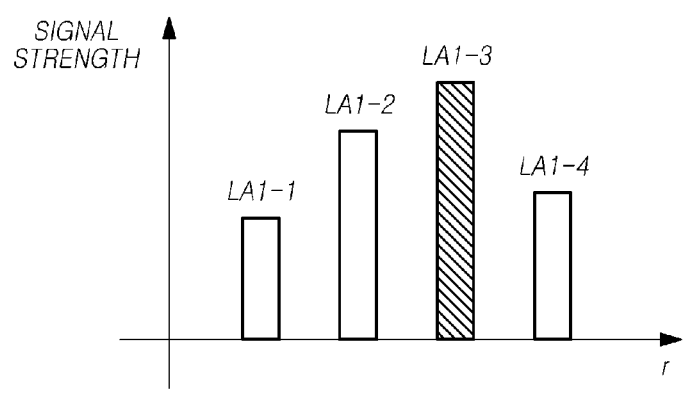
FIG. 9 is a graph illustrating a distribution of a signal strength of a resonance signal for extracting a distance value.

FIG. 9 is a graph illustrating a distribution of a signal strength of a resonance signal for extracting a distance value.

The processor 350 compares a distribution of a signal strength of each of the plurality of loop antennas 311 as illustrated in FIG. 9, and extracts a predetermined radius value r in a radius (a radius of R3'~R3') of a first loop antenna (LA1-3) that receives a resonance signal of the greatest signal strength as a distance value r of a point on the screen unit 110 indicated by the pointer 130.

A scheme of extracting (determining) a predetermined radius r in the radius (the radius of R3~R3') of the first loop antenna (LA1-3) that receives a resonance signal of the greatest signal strength may be performed by comparing a signal strength of a resonance signal received through each first loop antenna (including LA1-2 and LA1-4, and further including other loop antennas such as LA1-1) adjacent to the first loop antenna (LA1-3) that receives the resonance signal of the greatest signal strength. Referring to FIG. 9, when a signal strength of a resonance signal received through LA1-2 is greater than a signal strength of a resonance signal received through LA1-4, it indicates that the point on the screen unit 110 indicated by the pointer 130 exists in the radius of LA1-3, and is closer to a position of LA1-2 than to a position of LA1-4. Based on a ratio of the signal strength of the resonance signal received through LA1-2 to the signal strength of the resonance signal received through LA1-4, the predetermined radius value r is accurately extracted (determined) in the radius (the radius of R3~R3') of the first loop antenna (LA1-3) that receives the resonance signal of the greatest signal strength.

A scheme and a principle of extracting a distance value of polar coordinates have been described. Hereinafter, a scheme and a principle of extracting an angle value of polar coordinates will be described with reference to FIG. 10 and FIG. 11.

Figure 10:
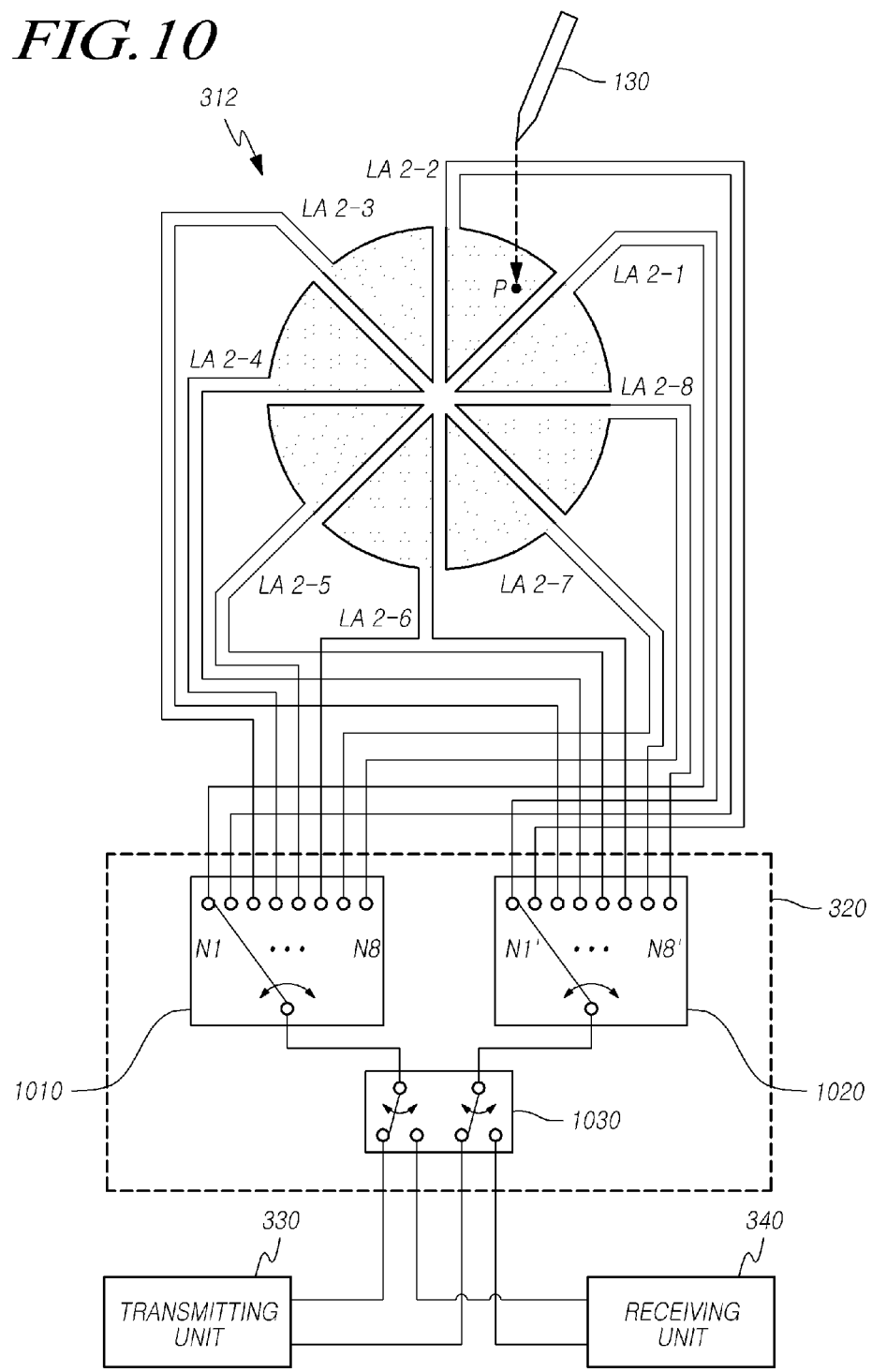
FIG. 10 is a diagram illustrating operations of a position detection apparatus for extracting an angle value of polar coordinates.

FIG. 10 is a diagram illustrating operations of the switching unit 320, the transmitting unit 330, the receiving unit 340, and the processor 350 included in the position detection apparatus 120 for extracting an angle value of polar coordinates.

A switching operation will be described with reference to FIG. 10. The switching unit 312 selects one antenna at a time from LA2-1, LA2-2, LA2-3, LA2-4, LA2-5, LA2-6, LA2-7, and LA2-8 corresponding to eight second loop antennas 312 using antenna selecting switches 1010 and 1020, and connects the second loop antenna selected by selecting switches 1010 and 1020 with the transmitting unit 330 or the receiving unit 340 using a transmitting/receiving switch 1030.

First, the antenna selecting switches 1010 and 1020 select two nodes (N1 and N1') included in an end of LA2-1 from among two nodes of an end of each of the eight second loop antennas 312.

The transmitting/receiving switch 1030 performs switching so as to connect the two nodes (N1 and N1') included in the end of LA2-1 with the transmitting unit 330 through a circuit.

Accordingly, the transmitting unit 330 provides a predetermined voltage to the two nodes (N1 and N1') of the end of LA2-1, and transmits an electromagnetic signal (magnetic field) to the pointer 130 so that a magnetic field is generated in LA2-1.

Subsequently, the transmitting/receiving switch 1030 performs switching so as to connect the two nodes (N1 and N1') included in the end of LA2-1 with the receiving unit 340 through a circuit.

Accordingly, the receiving unit 340 receives a resonance signal transmitted from the pointer 130 through LA2-1. Here, receiving a resonance signal indicates measuring a voltage that is induced in the two nodes (N1 and N1') of the end of LA2-1 by a resonance phenomenon occurring in the resonance circuit 360 of the pointer 130.

The processor 350 stores a signal strength of a resonance signal received through LA2-1. Here, the signal strength of the resonance signal may be the voltage (unit: [mV]) induced in the two nodes (N1 and N1') of the end of LA2-1 by the resonance phenomenon occurring in the resonance circuit 360 of the pointer 130.

Subsequently, the antenna selecting switches 1010 and 1020 select two nodes (N2 and N2') included in the end of LA2-2 from among two nodes included in the end of each of the eight second loop antennas 312.

Subsequently, the transmitting/receiving switch 1030 performs switching so as to connect the two nodes (N2 and N2') included in the end of LA2-2 with the transmitting unit 330 through a circuit.

Accordingly, the transmitting unit 330 provides a predetermined voltage to the two nodes (N2 and N2') of the end of LA2-2, and transmits an electromagnetic signal (magnetic field) to the pointer 130 so that a magnetic field is generated in LA2-2.

Subsequently, the transmitting/receiving switch 1030 performs switching so as to connect the two nodes (N2 and N2') included in the end of LA2-2 with the receiving unit 340 through a circuit.

Accordingly, the receiving unit 340 receives a resonance signal transmitted from the pointer 130 through LA2-2. Here, receiving a resonance signal indicates measuring a voltage that is induced in the two nodes (N2 and N2') of the end of LA2-2 by a resonance phenomenon occurring in the resonance circuit 360 of the pointer 130.

The processor 350 stores a signal strength of a resonance signal received through LA2-2. Here, the signal strength of the resonance signal may be the voltage (unit: [mV]) induced in the two nodes (N2 and N2') of the end of LA2-2 by the resonance phenomenon occurring in the resonance circuit 360 of the pointer 130.

As described above, the processor 350 stores signal strengths of resonance signals received through LA2-3, LA2-4, LA2-5, LA2-6, LA2-7, and LA2-8 and thus, may recognize a distribution of the signal strengths of the resonance signals received through all of the second loop antennas 312 as information for extracting an angle value.

It is assumed that a point indicated by the pointer 130 is an area that is included in an angle range of LA2-2 (θ1~θ2), with reference to FIG. 10. In this example, the distribution of signal strengths of the resonance signals recognized by the processor 350 is illustrated in FIG. 11.

Figure 11:
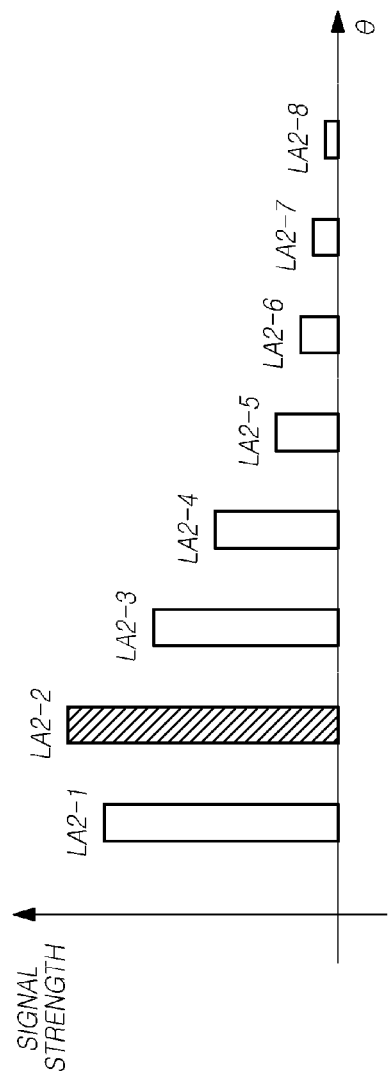
FIG. 11 is a graph illustrating a distribution of a signal strength of a resonance signal for extracting an angle value.

FIG. 11 is a graph illustrating a distribution of a signal strength of a resonance signal for extracting an angle value. As illustrated in FIG. 11, the processor 350 compares a distribution of a signal strength of each of the plurality of second loop antennas 312, and extracts a predetermined angle value θ in an angle range (an angle range of θ1~θ2) of a second loop antenna (LA2-2) that receives a resonance signal of the greatest signal strength as an angle value θ of a point on the screen unit 110 indicated by the pointer 130.

A scheme of extracting (determining) a predetermined angle value θ in the angle range (the angle range of θ1~θ2) of the second loop antenna (LA2-2) that receives a resonance signal of the greatest signal strength may be performed by comparing a signal strength of a resonance signal received through each second loop antenna (including LA2-1 and LA2-3, and further including other loop antennas such as LA2-4 and the like) adjacent to the second loop antenna (LA2-2) that receives the resonance signal of the greatest signal strength. Referring to FIG. 11, when a signal strength of a resonance signal received through LA2-1 is greater than a signal strength of a resonance signal received through LA2-3, it indicates that the point on the screen unit 110 indicated by the pointer 130 exists in the angle range (θ1~θ2) of LA2-2, and is closer to a position of LA2-1 than to a position of LA2-3. Based on a ratio of the signal strength of the resonance signal received through LA2-1 to the signal strength of the resonance signal received through LA2-3, the predetermined angle value θ is accurately extracted (determined) in the angle range (the angle range of θ1~θ2) of the second loop antenna (LA2-2) that receives the resonance signal of the greatest signal strength.

Figure 12:
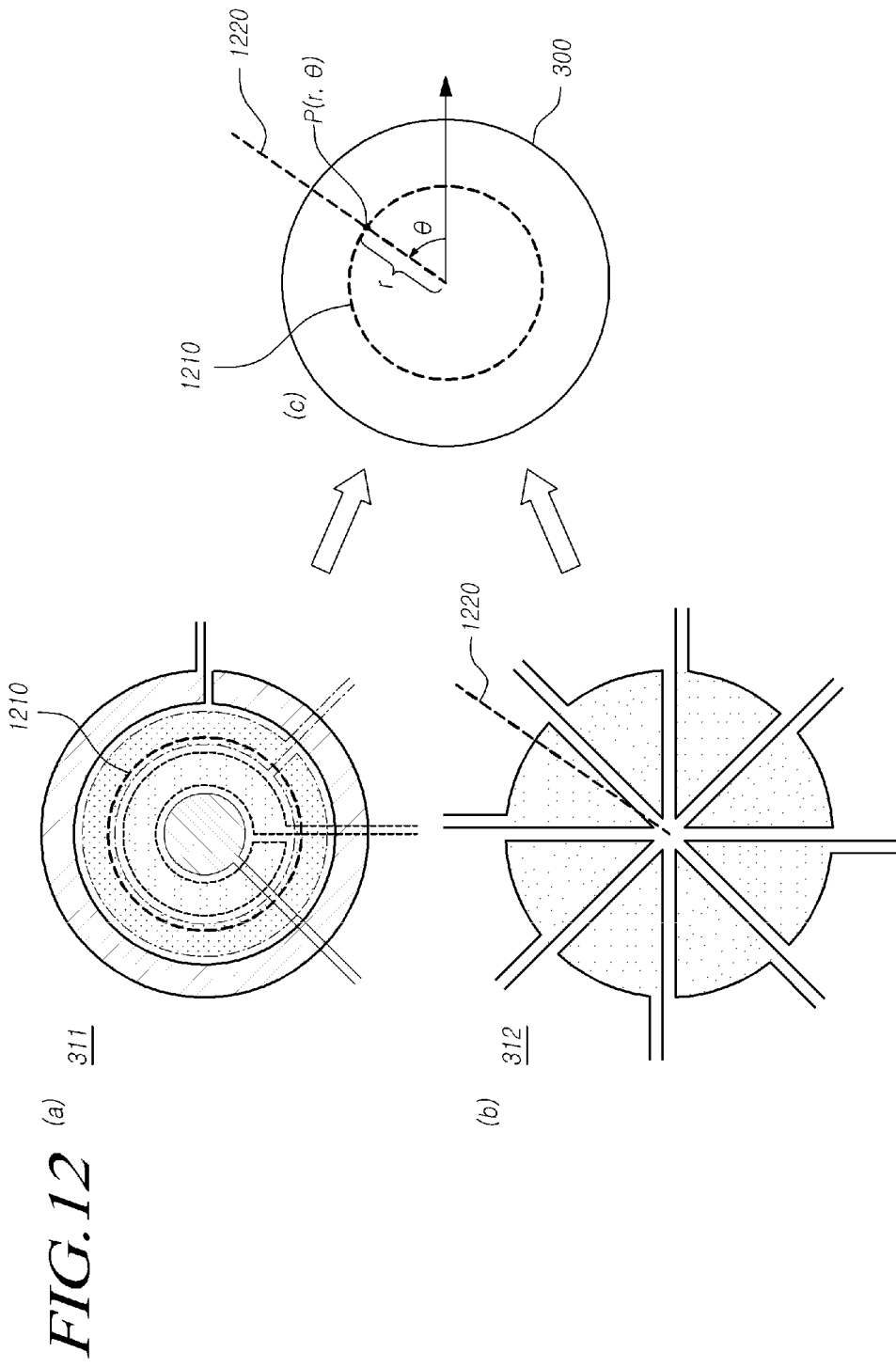
FIG. 12 is a diagram illustrating extracted polar coordinates including a distance value and an angle value.

FIG. 12 is a diagram illustrating extracted polar coordinates including a distance value and an angle value. The diagram on the top left side of FIG. 12 illustrates a distance value extraction result 1210 of FIGS. 8 and 9. The diagram on the bottom left side of FIG. 12 illustrates an angle value extraction result 1220 of FIGS. 10 and 11. The diagram on the right side of FIG. 12 illustrates that polar coordinates (r, θ) extracted using the distance value extraction result 1210 and the angle value extraction result 1220 are represented on the coordinate extraction area 300 on the screen unit 110.

Referring to the diagram on the right side of FIG. 12, by matching the distance value extraction result 1210 and the angle value extraction result 1220, a point having the extracted angle value θ from among points on a circle formed based on the extracted distance value r is determined as a point P indicated by the pointer 130. The polar coordinates of the determined point P are (r, θ).

A scheme of extracting polar coordinates has been described. Hereinafter, a reception characteristic of the first loop antenna 311 which is a polar coordinate antenna for extracting a distance value of polar coordinates and a reception characteristic of the second loop antenna 312 which is a polar coordinate antenna for extracting an angle value of polar coordinates will be described with reference to FIGS. 13 and 14.

Figure 13:
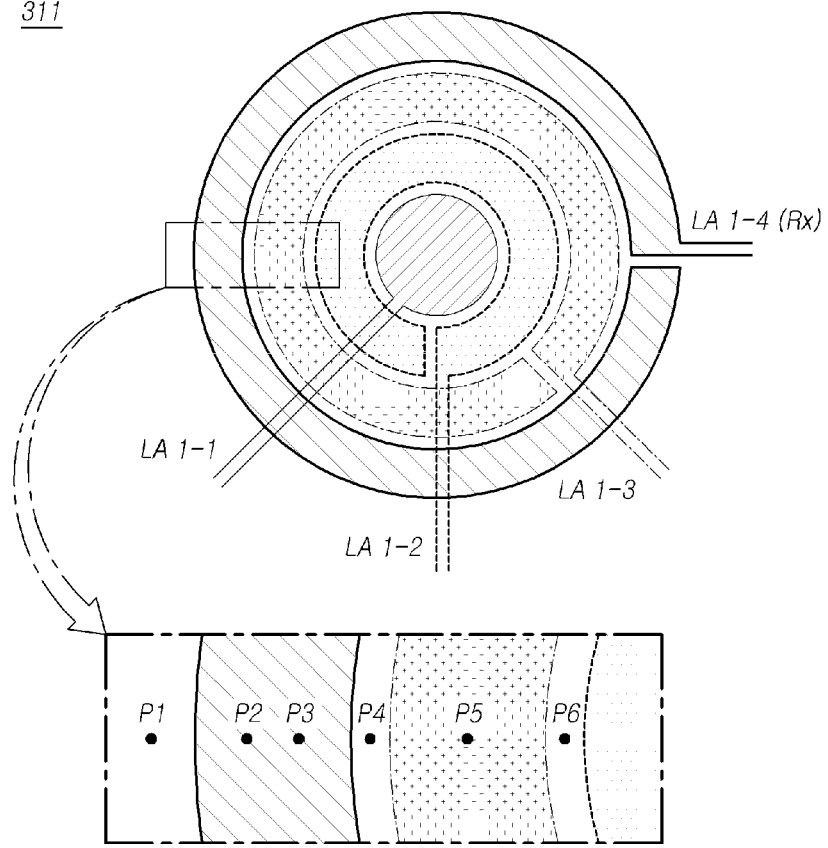
FIG. 13 is a diagram illustrating a result of an experiment related to a reception characteristic of a first loop antenna according to an embodiment of the present invention.

FIG. 13 is a diagram illustrating an experimental result associated with a reception characteristic of the first loop antenna 311 according to an embodiment of the present invention. Referring to the diagram of FIG. 13, a signal strength of a response signal received through LA1-4 is measured at each location, by transmitting an electromagnetic signal to the pointer 130, fixing LA1-4 as a first loop antenna that receives a resonance signal, and changing a position of the pointer 130 to P1, P2, P3, P4, P5, and P6 in turn. In this example, the table of FIG. 13 aligns measured signal strengths in order of largest value.

Referring to the table of FIG. 13, the signal strengths of P3, P2, P4, P1, P5, and P6 where the pointer 130 is located, are sequentially large (V3>V2>V4>V1>V5>V6). Referring to the table of FIG. 13, a signal strength measured when the pointer 130 is located in a radius of a first loop antenna (LA1-4) that receives a resonance signal (P3 and P2) is greater than a signal strength measured when the pointer 130 is located in the outside of the radius of the first loop antenna (LA1-4) that receives a resonance signal (P4, P1, P5, and P6).

That is, in the case in which the pointer 130 is located in the outside of the radius of the first loop antenna (LA1-4) that receives a resonance signal (P4, P1, P5, and P6), as the position becomes farther, in a lateral direction, from the first loop antenna (LA1-4) that receives a resonance signal, a signal strength becomes smaller.

Figure 14:
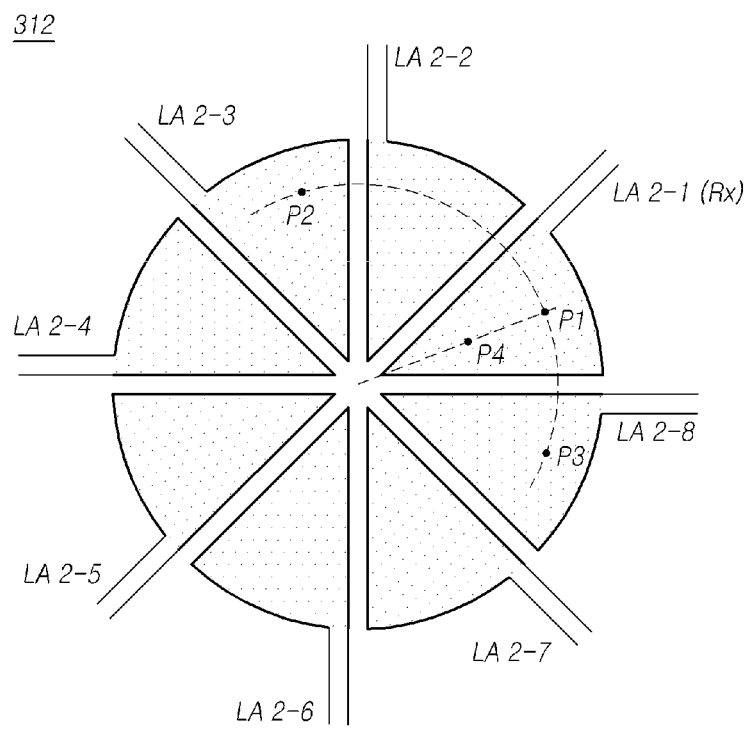
FIG. 14 is a diagram illustrating a result of an experiment related to a reception characteristic of a second loop antenna according to an embodiment of the present invention.

FIG. 14 is a diagram illustrating an experimental result of a reception characteristic of the second loop antenna 312 according to an embodiment of the present invention. Referring to the diagram of FIG. 14, a signal strength of a response signal received through LA2-1 is measured at each location, by transmitting an electromagnetic signal to the pointer 130, fixing LA2-1 as a second loop antenna that receives a resonance signal, and changing a position of the pointer 130 to P1, P2, P3, P4, P5, and P6 in turn. In this example, the table of FIG. 14 aligns measured signal strengths in order of largest value.

Referring to the table of FIG. 14, the signal strengths of P4, P1, P3, and P2 where the pointer 130 is located, are sequentially large (V4>V1>V3>V2). Here, P1, P2, and P3 have an identical radius and have different angle ranges, and P1 and P4 have an identical angle and have different radii.

Referring to the table of FIG. 14, a signal strength measured when the pointer 130 is located in the angle range of a second loop antenna (LA2-1) that receives a resonance signal (P4 and P1) is greater than a signal strength measured when the pointer 130 is located in the outside of the angle range of the second loop antenna (LA2-1) that receives a resonance signal (P3 and P2).

That is, in the case in which the pointer 130 is located in the outside of angle range of the second loop antenna (LA2-1) that receives a resonance signal (P3 and P2), as the position becomes farther, clockwise and counterclockwise, from the second loop antenna (LA2-1) that receives a resonance signal, a signal strength becomes smaller.

A position detection method of the position detection apparatus 120 according to an embodiment of the present invention that has been described in the above will be described briefly again with reference to FIG. 15.

Figure 15:
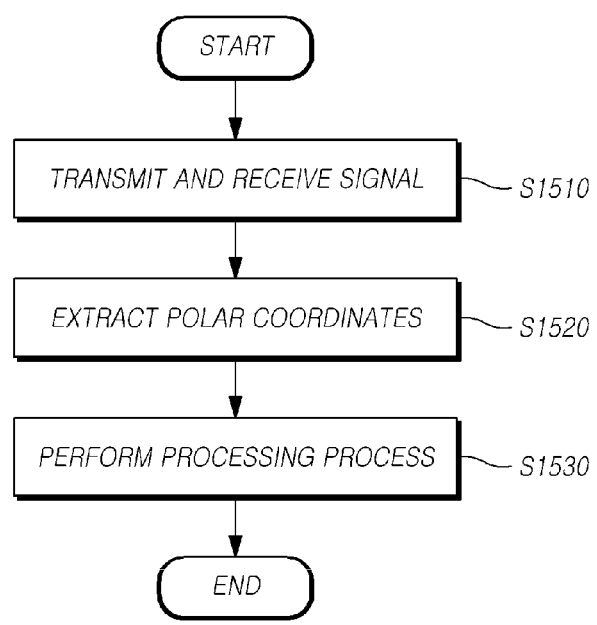
FIG. 15 is a flowchart illustrating a position detection method according to an embodiment of the present invention.

FIG. 15 is a flowchart of a position detection method according to an embodiment of the present invention. Referring to FIG. 15, the position detection method according to an embodiment of the present invention includes a signal transmitting and receiving step S1510 that selects one antenna at a time from a plurality of loop antennas, transmits an electromagnetic signal to the pointer 130 that indicates the screen unit 110 through the selected loop antenna, and receives, from the pointer 130, a resonance signal corresponding to the electromagnetic signal transmitted through the selected loop antenna, and a polar coordinates extracting step S1520 that extracts polar coordinates including a distance value and an angle value of a point on the screen unit 110 indicated by the pointer 130, based on a distribution of a signal strength of a resonance signal received through each of the plurality of loop antennas.

Here, the plurality of loop antennas may include the plurality of first loop antennas 311 that are disposed therein, having different radii, and the plurality of second loop antennas 312 that are disposed therein, having different angle ranges.

The signal transmitting and receiving step S1510 is repeatedly performed with respect to each of the plurality of first loop antennas 311. Before or after this, step S1510 may be repeatedly performed with respect to each of the plurality of second loop antennas.

The polar coordinates extracting step S1520 recognizes a distribution of a signal strength of each of the plurality of first loop antennas 311 based on a received resonance signal for each of the plurality of first loop antennas 311, extracts a distance value r of a point (P) on the screen unit 110 indicated by the pointer 130, recognizes a distribution of a signal strength of each of the plurality of second loop antennas 312 based on a received resonance signal for each of the plurality of second loop antennas 312, extracts an angle value θ of the point (P) on the screen unit 110 indicated by the pointer 130, and extracts polar coordinates (r, θ) of the point (P) on the screen unit 110 indicated by the pointer 130.

After the polar coordinates of the point (P) on the screen unit 110 indicated by the pointer 130 are extracted by the position detection apparatus 120, a process processing step S1530 in which the processor 350 performs a process corresponding to the extracted polar coordinates may be further executed. Here, the process corresponding to the extracted polar coordinates may be, for example, a process corresponding to an object displayed on the point (P) of the polar coordinates on the screen unit 110, a screen changing process, an application execution process, a character input process, and the like, and may not be limited thereto and may correspond to all input processes associated with an operation that may be performed by manipulation of a user.

Figure 16:
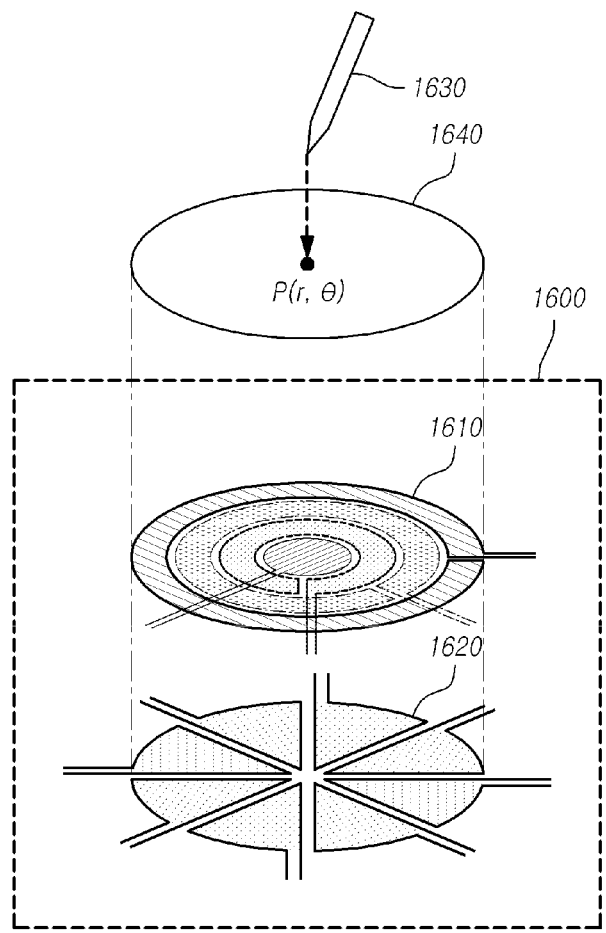
FIG. 16 is a diagram illustrating an antenna apparatus for position detection according to an embodiment of the present invention.

FIG. 16 is a diagram schematically illustrating an antenna apparatus 1600 for position detection according to an embodiment of the present invention. Referring to FIG. 16, the antenna apparatus 1600 for position detection according to an embodiment of the present invention includes a plurality of loops in which a first voltage is provided and an electromagnetic signal is generated so that a resonance phenomenon occurs in a pointer 1630 that indicates a screen unit 1640 disposed in an upper portion of the antenna apparatus 1600, and a second voltage is generated by the resonance phenomenon occurring in the pointer 1630.

Referring to FIG. 16, the plurality of loops, which are polar coordinate loops for extracting polar coordinates (r, θ) of a point (P) on the screen unit 1640 indicated by the pointer 1630, include a plurality of first loops 1610 that are disposed therein, having different radii, and a plurality of second loops 1620 that are disposed therein, having different angle ranges. Here, a principle and a scheme of extracting the polar coordinates (r, θ) are identical to the principle and the scheme of extracting polar coordinates that have been described with reference to FIGS. 1 through 15.

Here, the first loop 1610 corresponds to the first loop antenna 311, and the second loop 1620 corresponds to the second loop antenna 312.

The polar coordinate antenna unit 310 of FIG. 3 may be embodied as the antenna apparatus 1600 for position detection of FIG. 16 according to an embodiment of the present invention.

As described above, according to the present invention, a position detection method appropriate for a circular display having a circular position detection area, the position detection apparatus 120, the antenna apparatus 1600, and the display apparatus 100 are provided.

Also, according to the present invention, a position detection method that enables pen-input using a pen appropriate for a circular display having a circular position detection, the position detection apparatus 120, the antenna apparatus 1600, and the display apparatus 100 are provided.

Also, according to the present invention, a position detection method that enables effective signal processing for extracting coordinates, the position detection apparatus 120, the antenna apparatus 1600, and the display apparatus 100 are provided.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A position detection apparatus, comprising:
   a polar coordinate antenna unit including a plurality of first loop antennas of different radii and a plurality of second loop antennas of different angle ranges;
   a switching unit configured to select one loop antenna at a time from the plurality of first loop antennas, and to select one loop antenna at a time from the plurality of second loop antennas;
   a transmitting unit configured to transmit an electromagnetic signal through the selected first loop antenna, and to transmit an electromagnetic signal through the selected second loop antenna;
   a receiving unit configured to receive, from a pointer, a resonance signal corresponding to the electromagnetic signal transmitted through the selected first loop antenna, and to receive, from the pointer, a resonance signal corresponding to the electromagnetic signal transmitted through the selected second loop antenna; and
   a processor configured to recognize a distribution of a signal strength of each of the plurality of first loop antennas based on the resonance signal received for each of the plurality of first loop antennas, and to recognize a distribution of a signal strength of each of the plurality of second loop antennas based on the resonance signal received for each of the plurality of second loop antennas, so as to extract polar coordinates including a distance value and an angle value of a point on a screen unit indicated by the pointer.

2. The position detection apparatus as claimed in claim 1, wherein a number of first loop antennas is determined based on a predetermined distance resolution.

3. The position detection apparatus as claimed in claim 1, wherein the plurality of first loop antennas include a first loop antenna formed in a circular shape and having a minimum radius, and at least two first loop antennas formed in a donut shape and having radii greater than the minimum radius.

4. The position detection apparatus as claimed in claim 1, wherein the plurality of first loop antennas have different radii, and are disposed to be spaced apart from one another or to intersect with one another.

5. The position detection apparatus as claimed in claim 4, wherein a number of radii with which a radius of one of the plurality of first loop antennas intersects is determined based on a predetermined distance resolution.

6. The position detection apparatus as claimed in claim 1, wherein a number of second loop antennas is determined based on a predetermined angle resolution.

7. The position detection apparatus as claimed in claim 1, wherein the plurality of second loop antennas include at least two second loop antennas that are formed in a fan shape, have an identical central angle, and have different angle ranges.

8. The position detection apparatus as claimed in claim 1, wherein the plurality of second loop antennas have different angle ranges, and are disposed to be spaced apart from one another or to intersect with one another.

9. The position detection apparatus as claimed in claim 8, wherein a number of angle ranges with which an angle range of one of the plurality of second loop antennas intersects is determined based on a predetermined angle resolution.

10. The position detection apparatus as claimed in claim 1, wherein the processor compares the distribution of the signal strength of each of the plurality of first loop antennas, and extracts a predetermined radius value in a radius of a first loop antenna that receives a resonance signal having the strongest signal strength as a distance value of the point on the screen unit indicated by the pointer.

11. The position detection apparatus as claimed in claim 1, wherein the processor compares the distribution of the signal strength of each of the plurality of second loop antennas, and extracts a predetermined angle value in an angle range of the second loop antenna that receives a resonance signal of the strongest signal strength as an angle value of the point on the screen unit indicated by the pointer.

12. A position detection method, comprising the steps of:
transmitting and receiving a signal to select one loop antenna at a time from a plurality of loop antennas, to transmit, through the selected loop antenna, an electromagnetic signal to a pointer indicating a screen unit, and to receive, from the pointer, a resonance signal corresponding to the electromagnetic signal transmitted through the selected loop antenna; and
performing a polar coordinate extraction to extract polar coordinates including a distance value and an angle value of a point on the screen unit indicated by the pointer, based on a distribution of a signal strength of a resonance signal received through each of the plurality of loop antennas.

* * * * *